United States Patent
Lesartre et al.

(10) Patent No.: US 10,789,115 B2
(45) Date of Patent: Sep. 29, 2020

(54) TRANSMITTER THAT DOES NOT RESEND A PACKET DESPITE RECEIPT OF A MESSAGE TO RESEND THE PACKET

(71) Applicant: HEWLETT PACKARD ENTERPRISE DEVELOPMENT LP, Houston, TX (US)

(72) Inventors: Gregg B. Lesartre, Fort Collins, CO (US); James D. Regan, Fort Collins, CO (US); John W. Bockhaus, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 12 days.

(21) Appl. No.: 15/513,908

(22) PCT Filed: Oct. 9, 2014

(86) PCT No.: PCT/US2014/059882
§ 371 (c)(1),
(2) Date: Mar. 23, 2017

(87) PCT Pub. No.: WO2016/057038
PCT Pub. Date: Apr. 14, 2016

(65) Prior Publication Data
US 2017/0288814 A1   Oct. 5, 2017

(51) Int. Cl.
*G06F 11/07*   (2006.01)
*H04L 12/947*   (2013.01)
(Continued)

(52) U.S. Cl.
CPC ............ *G06F 11/0772* (2013.01); *H04L 1/08* (2013.01); *H04L 1/1835* (2013.01); *H04L 1/201* (2013.01);
(Continued)

(58) Field of Classification Search
None
See application file for complete search history.

(56) References Cited

U.S. PATENT DOCUMENTS

| 5,959,995 A * | 9/1999 | Wicki ............... H04L 45/34 370/351 |
| 6,170,025 B1 * | 1/2001 | Drottar ............ H04L 1/0057 709/201 |

(Continued)

FOREIGN PATENT DOCUMENTS

WO   WO-2013086456 A1   6/2013

OTHER PUBLICATIONS

CSPI Inc., "Myrinet Links and Routing," (Web Page), 18 pages, retrieved on Sep. 9, 2014 at http://www.cs.virginia.edu/~fzb8n/myrinet/documentation/link/index.html.

(Continued)

*Primary Examiner* — Steve N Nguyen
(74) *Attorney, Agent, or Firm* — Park, Vaughan, Fleming & Dowler LLP

(57) ABSTRACT

A processing device includes an internal transmitter to receive packets and to forward those packets across a link to an external receiver external to the processing device. The internal transmitter is to receive a portion of a packet and to begin transmitting the portion across the link to the external receiver before the entire overall packet, of which the portion is a part, is received and validated. For a packet determined to have an error, the internal transmitter does not resend the overall packet across the link even if a message is received from the external receiver to resend the overall packet.

10 Claims, 7 Drawing Sheets

(51) Int. Cl.
*H04L 12/861* (2013.01)
*H04L 1/18* (2006.01)
*H04L 1/20* (2006.01)
*H04L 1/08* (2006.01)
*H04L 12/721* (2013.01)
*H04L 12/823* (2013.01)
*H04L 1/00* (2006.01)

(52) U.S. Cl.
CPC .............. *H04L 45/40* (2013.01); *H04L 47/32* (2013.01); *H04L 49/251* (2013.01); *H04L 49/9068* (2013.01); *H04L 2001/0097* (2013.01)

(56) References Cited

U.S. PATENT DOCUMENTS

| | | | |
|---|---|---|---|
| 7,639,701 B2 | 12/2009 | Drottar et al. | |
| 7,761,687 B2 | 7/2010 | Blumrich et al. | |
| 7,773,591 B2* | 8/2010 | Tsang | H04L 49/552 370/236 |
| 7,792,014 B2* | 9/2010 | Tsang | H04L 1/1874 370/216 |
| 8,667,049 B2 | 3/2014 | Blumrich et al. | |
| 8,761,166 B2 | 6/2014 | Scott et al. | |
| 2007/0115823 A1* | 5/2007 | Shen | H04L 1/1874 370/235 |
| 2007/0130353 A1 | 6/2007 | Chou et al. | |
| 2008/0072113 A1 | 3/2008 | Tsang et al. | |
| 2008/0189586 A1* | 8/2008 | Ike | G06F 13/37 714/748 |
| 2009/0222705 A1 | 9/2009 | Hekstra-Nowacka et al. | |
| 2012/0087379 A1 | 4/2012 | Hsieh et al. | |
| 2015/0181618 A1* | 6/2015 | Yang | H04L 69/03 370/329 |

OTHER PUBLICATIONS

Greg. S., "System Interconnect Fabrics: Ethernet Versus Rapidio® Technology," (Web Page), Technology White Paper, Feb. 2007, 56 pages, available at http://cache.freescale.com/files/32bit/doc/app_note/AN3086.pdf.
International Search Report & Written Opinion received in PCT Application No. PCT/US2014/059882, dated Jun. 30, 2015, 10 pages.

* cited by examiner

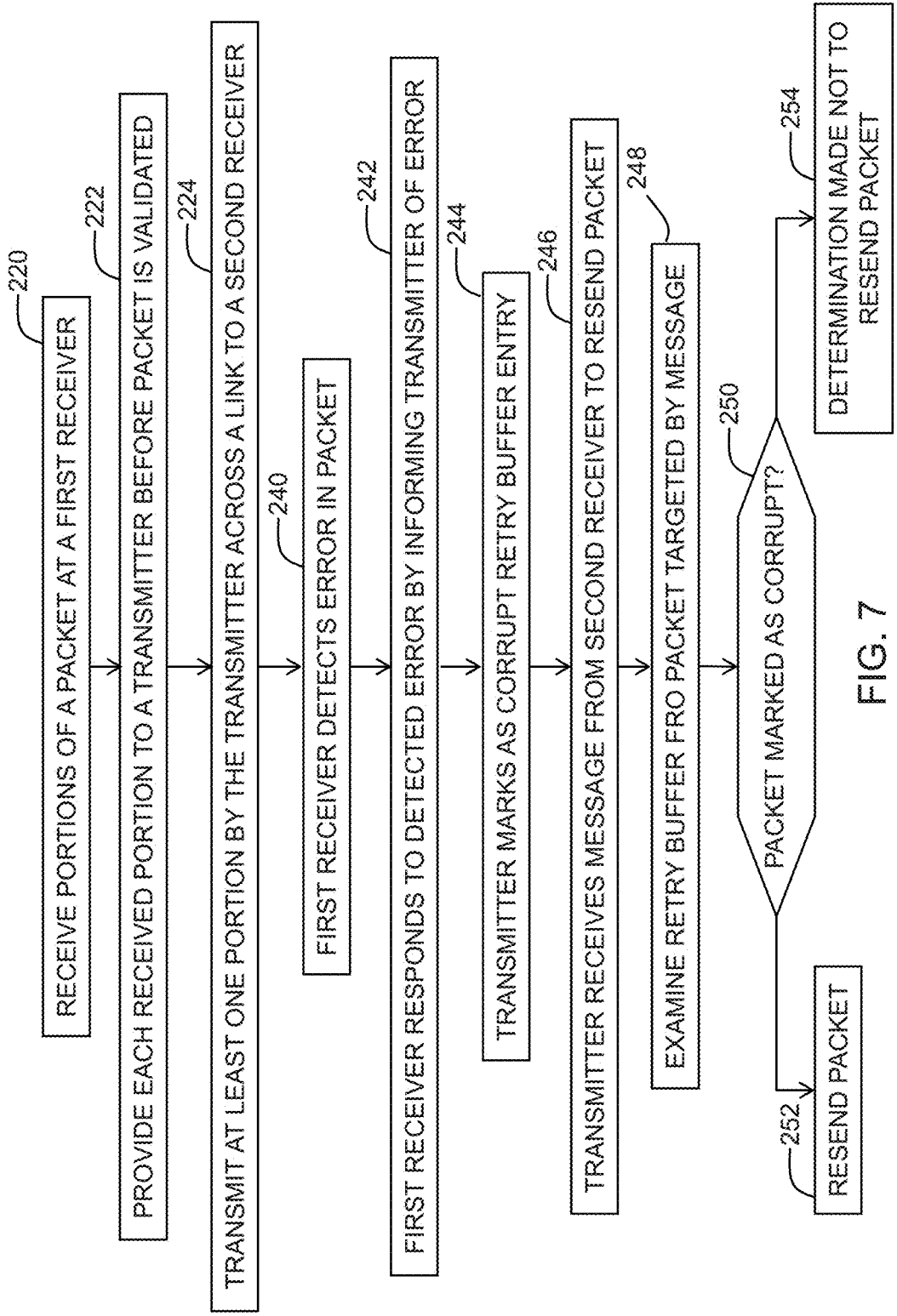

US 10,789,115 B2

TRANSMITTER THAT DOES NOT RESEND A PACKET DESPITE RECEIPT OF A MESSAGE TO RESEND THE PACKET

BACKGROUND

In computer systems, information may be sent between nodes over a "link." Links are communication channels that could be electrical or optical and vary in terms of, for example, width and speed. To ensure reliable delivery of the information, nodes communicating with each other over a link may implement "Link Level Retry" ("LLR"). With LLR, the transmitting node may assign a sequence number to each packet, store the packet into an LLR buffer, and, when requested, retry (resend) the packet across the link.

A receiving node can detect whether the received packet has been received in error (e.g., by checking the cyclic redundancy check ("CRC") bits in the packet). If a packet is received in error, the receiving node may send a message back to the transmitting node to resend that particular packet, using the packet's sequence number to specify which packet to retry. If no errors are detected, the receiving mode may periodically send an acknowledgment (ACK) of one or more of the packets received error-free. Receipt of the ACK permits the transmitting node to remove the packets from the LLR buffer.

BRIEF DESCRIPTION OF THE DRAWINGS

For a detailed description of various examples, reference will now be made to the accompanying drawings in which:

FIG. 7 shows another example of a method in accordance with various examples.

DETAILED DESCRIPTION

Figure 1:
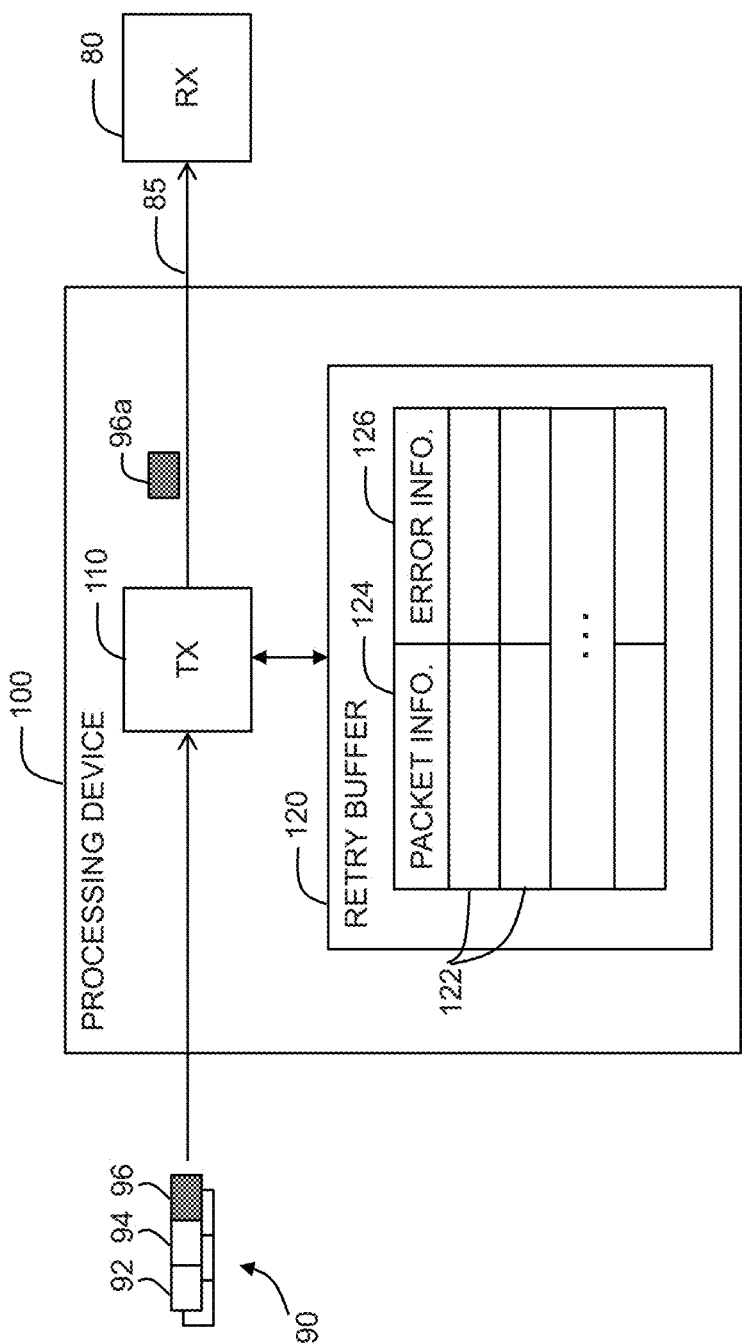
FIG. 1 shows a system in accordance with various examples.

In the figures, "TX" refers to a transmitter and "RX" refers to a receiver.

Processing devices, such as switches, may include multiple ports. Packets of data may be received on any given port and are to be routed through one or more other ports in accordance with, for example, a routing table. A data packet may comprise multiple sub-packets and each such sub-packet is transmitted through a network and thus through the processing device. While packets may be of variable length, sub-packets may be of a fixed length. The packet may also include error detection bits, such as Cyclic Redundancy Check (CRC) bits that are usable to detect whether a received packet includes an error (e.g., one or more bits received with polarity opposite from what was intended—a "0" that is received as a "1", and vice versa). The CRC bits for a packet are analyzed upon receipt of the packet at each hop along the way through the network between the packet's source and the intended destination. Upon receipt of a packet by a receiver, the receiver calculates a CRC value from the received packet. The receiver then compares this calculated CRC against the CRC sent from the transmitter with the packet, Failure of the CRC values to match indicates the presence of an error.

The CRC bits may be included at the tail end of the packet and thus can only be checked once the entire packet is received. To avoid forwarding a packet with an error, the receiver of the packet may not forward the packet on until the entire packet is received and the CRC bits are successfully validated. This technique ensures packets with errors are not further propagated through the network, but does so at the expense of holding up packets with no errors thereby introducing latency into the network.

The disclosed examples avoid such latency by implementing "cut-through routing" in which sub-packets (also called "portions") of a packet are forwarded on before the entire packet is validated. The disclosed examples also implement LLR in which a receiver may cause a transmitter to resend a packet not correctly received. A mechanism is also included to reduce the likelihood that a transmitter will resend a packet previously determined to have an error before the request to resend is received. That is, cut-through routing means that a transmitter may cause portions of a packet received from an upstream receiver to be forwarded on to a downstream receiver before the upstream receiver has checked or perhaps even received the CRC bits. Thus, the transmitter may forward on portions of a packet that will ultimately be determined to have an error by the upstream receiver. The transmitter forwards the portions anyway to reduce latency as noted above, but runs the risk of propagating an error-plagued packet to the downstream receiver. The downstream receiver may detect an error with the packet and request the packet to be resent by the transmitter in accordance with the LLR protocol. By the time the packet resend message is received by the transmitter, the upstream receiver may have detected an error with the packet and thus may have communicated that fact to the transmitter. The transmitter then may refuse to resend the packet despite the resend request from the downstream receiver.

FIG. 1 illustrates an example of a processing device 100. The processing device 100 of FIG. 1 may be a switch or other type of device that receives and transmits packets. Processing device 100 receives packets 90. A transmitter 110 internal to the processing device receives the packets 90 and forwards them on to a receiver 80 that is external to the processing device. The transmitter 110 communicates with the external receiver 80 over a link 85. In one example, each link described herein is implemented as a serializer/deserializer (SERDES) link.

Each packet 90 may be sub-divided into portions (e.g., portions 92, 94, 96) and routed through the processing device 100 in portions. Portion 96 is illustrated as being output by transmitter 110 on link 85 as portion 96a. Thus, transmitter 110 transmits each received packet 90 across link 85 to external receiver 80 in discrete sequential portions. Receiver 80 may be internal to another processing device (e.g., another switch, an end node, etc.).

The processing device 100 also includes a retry buffer 120 accessible to the transmitter 110. In some implementations (e.g., FIGS. 1 and 2), the retry buffer may be separate from, but in communication with, the transmitter 110, while in other implementations (e.g., FIGS. 3 and 4) the retry buffer may be part of the transmitter, That a retry buffer is accessible to the transmitter includes either implementation.

The retry buffer includes multiple entries 122. Each entry includes packet information 124 and error information 126. The packet information 124 includes, for example, a copy of each data packet transmitted by the associated transmitter 110. The transmitter 110 has access to copies of data packets in the retry buffer 120 in the event that an external receiver (e.g., receiver 80) detects an error with a packet provided to it by transmitter 110 and causes a message to be sent to processing device 100 requesting that particular packet to be resent. Periodically, the processing device 100 may receive ACKs from the device containing receiver 80 indicating error-free receipt of packets to which the ACK corresponds. Such packets then can be removed from the retry buffer 120.

The error information 126 in the retry buffer may comprise a bit field to indicate whether the packet corresponding to the packet information 124 has experienced an error. Thus, a packet can be marked as corrupt by setting one or more bits in the error information 126. In some examples, error information 126 may comprise a single status bit in which one logic state is used to indicate a lack of a detected error with the packet and the opposite state is used to indicate an error (corrupt packet).

In the example of FIG. 1, the transmitter 110 may receive a portion of a packet 90 (e.g., portion 96a) and begin transmitting that portion across the link 85 to the external receiver 80 before the entire overall packet 90, of which the portion is a part, is received and validated (e.g., using CRC bits in the packet). Further, the transmitter 110 may determine the overall packet to have an error, mark the overall packet as corrupt in the retry buffer 120, and not resend the overall packet across the link even if, per the LLR protocol, a message is received from the device containing the external receiver 80 to resend the overall packet.

The transmitter 110 determining that a given packet has an error broadly means that the transmitter is somehow made aware of the error. In one example, the transmitter 110 itself may determine the existence of an error with a packet by detecting the error via the CRC bits. That is, the transmitter 110 detects the error by the CRC bits in the packet received to be forwarded on by the transmitter.

Figure 2:
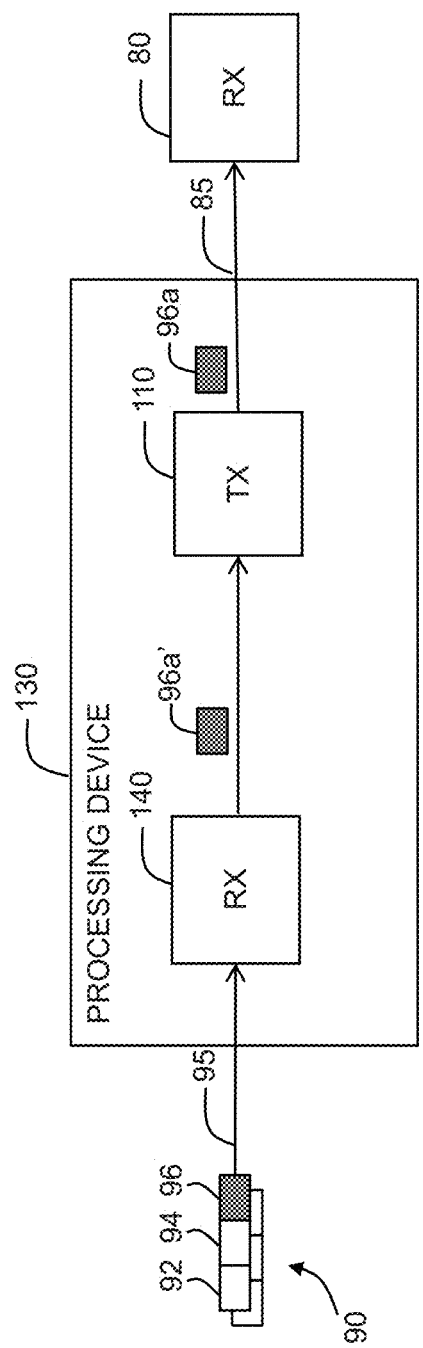
FIG. 2 shows another system in accordance with various examples.

In another example, the transmitter 110 determines the existence of the error by being informed of the error by an upstream receiver. FIG. 2, for example, shows another example of a processing device 130 including the internal transmitter 110 and an internal receiver 140. The receiver 140 receives packets across a link 95 from, for example, an external upstream transmitter in another processing device and checks the CRC bits of each such packet to validate each such received packet. The receiver 140 forwards portions of each packet to the transmitter 110 which, in turn, forwards those portions across link 85 to external receiver 80. For example, portion 96 is forwarded by the receiver 140 to the transmitter 110 as portion 96a', and transmitter 110 forwards portion 96a' across link 85 as portion 96a. In accordance with cut-through routing, the receiver 140 for yards the portion 96a' of the overall packet 90 to the transmitter 110 before the receiver 140 validates the entire overall packet. If the receiver 140 subsequently detects an error with a packet, the receiver 140 informs the transmitter 110 of the error for the transmitter to thereby determine the overall packet to have the error. In this example, the transmitter 110 determines the packet to have an error based on a message or signal received by the transmitter 110 from the receiver 140 which actually detected the error.

Figure 3:
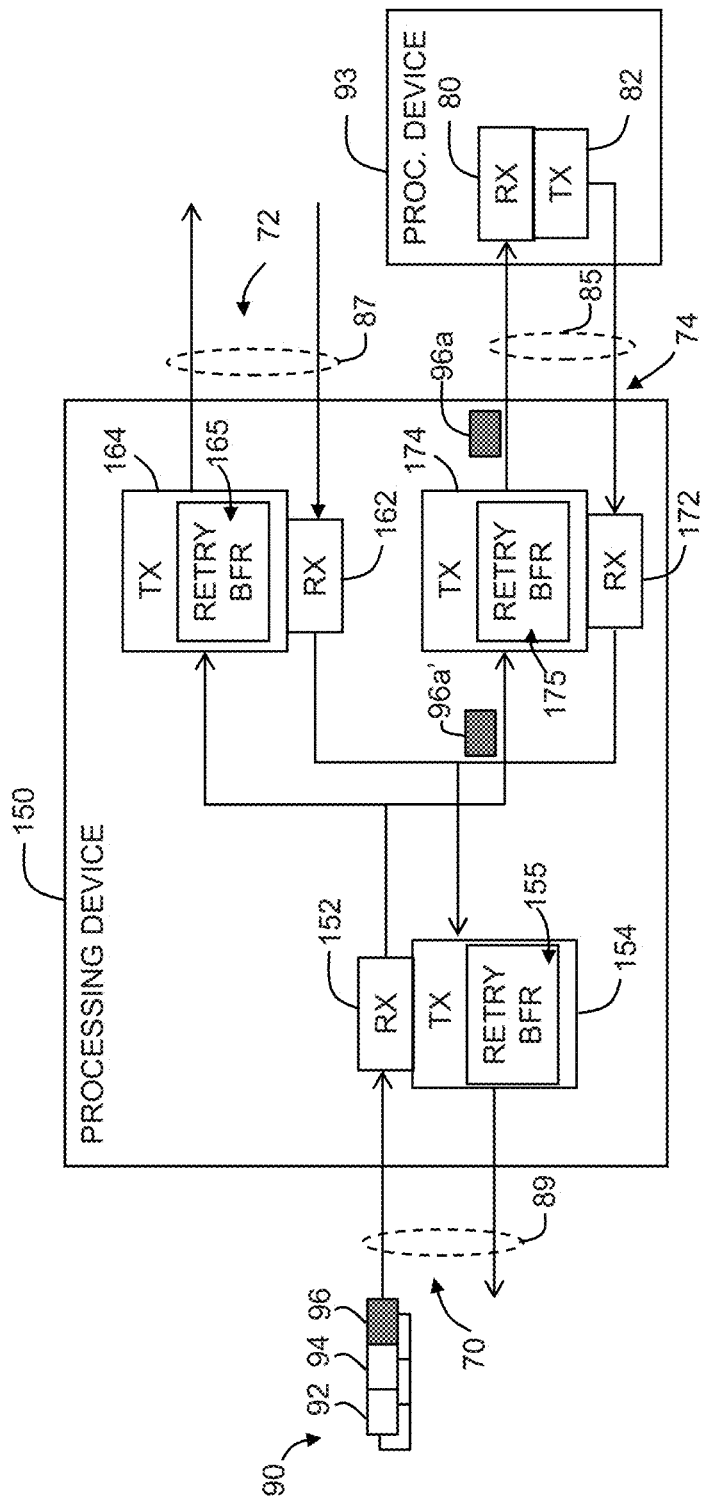
FIG. 3 shows yet another system in accordance with various examples.

FIG. 3 shows another example of a processing device 150. The illustrative processing device 150 of FIG. 3 includes three ports 70, 72, and 74, although the number of ports can be varied as desired. A receiver/transmitter pair is associated with each port and each such receiver/transmitter may communicate with an external device via a link. Thus, port 70 includes receiver 152 and transmitter 154 which communicate via a link 89. Port 72 includes receiver 162 and transmitter 164 which communicate via a link 87. Port 74 includes receiver 172 and transmitter 174 which communicate via link 85 with a corresponding transmitter 82 and receiver 80 which may be part of another processing device 93 as shown. The other links 87 and 89 may also be coupled to other processing devices. Each transmitter includes or otherwise has access to a retry buffer. Thus, each of transmitters 154, 164, and 174 has access to retry buffers 155, 165, and 175, respectively.

Receiver 152 may receive packet portions (e.g., portion 96) of an overall packet and, per cut-through routing, forward such portions (e.g., portion 96a') to transmitter 174 for forwarding on via link 85 to receiver 80 in processing device 93. Receiver 152 forwards such packet portions to transmitter 174 before the packet is determined to have an error as explained above. Upon determining that a given packet has an error, the receiver 152 may inform the transmitter 174 of the error (or the transmitter 174 may detect the error itself) after the transmitter 174 has already transmitted at least one portion (e.g., portion 96a) of the packet across link 85 to the receiver 80.

If the receiver 80 detects an error with a packet received over link 85, in accordance with the LLR mechanism, the receiver 80 may cause its corresponding transmitter 82 to send a message to receiver 172 over link 85 to request the packet to be resent by transmitter 174. If the packet being requested to be resent has already been determined to have an error and marked as such in the transmitter's retry buffer 175, the transmitter 174 either may simply not directly respond to the retry request message transmitted by the processing device 93 (other than perhaps skipping the known bad packet and continuing with the next packet believed to be good, reassigning sequence numbers as necessary), or send a message to the receiver 80 indicating that the packet requested to be resent is corrupt. In the latter case, the processing device 93 will not wait for the packet to be resent and not issue any more retry requests for that packet and discontinue forwarding that packet to downstream transmitters. The processing device 93 may drop the packet altogether. Further, the receiver 152, which may have detected the packet to have an error, may request packet 90 to be resent, and upon re-receiving packet 90 may resend the packet (now without an error) to transmitter 174 or to a different transmitter (e.g., in the situation in which the corruption to the packet involved the routing information in the packet) in the processing device 150, such as transmitter 164 to be transmitted across a link different than the initial link 85 (e.g., link 87). The receiver 152 may determine whether to resend the overall packet to transmitter 174 to be forwarded across its link 85 or to a different internal transmitter (e.g., transmitter 164) to be transmitted across a different link (e.g., link 87).

In the example of FIG. 3 (as also may be true of the other disclosed examples), each transmitter implements LLR in which the transmitter retries a packet across its link to a receiver upon request for a retry received over that link. The transmitter, however, does not retry a packet if the packet has been determined to have an error despite receipt of a request for a retry of the packet having the error. A given transmitter does not retry a packet despite receipt of a request initiated by an external receiver for a retry if the request for the retry is for a packet whose error information 126 in the transmitter's retry buffer (e.g., retry buffers 155, 165, 175) indicates that the packet has experienced an error.

Figure 4:
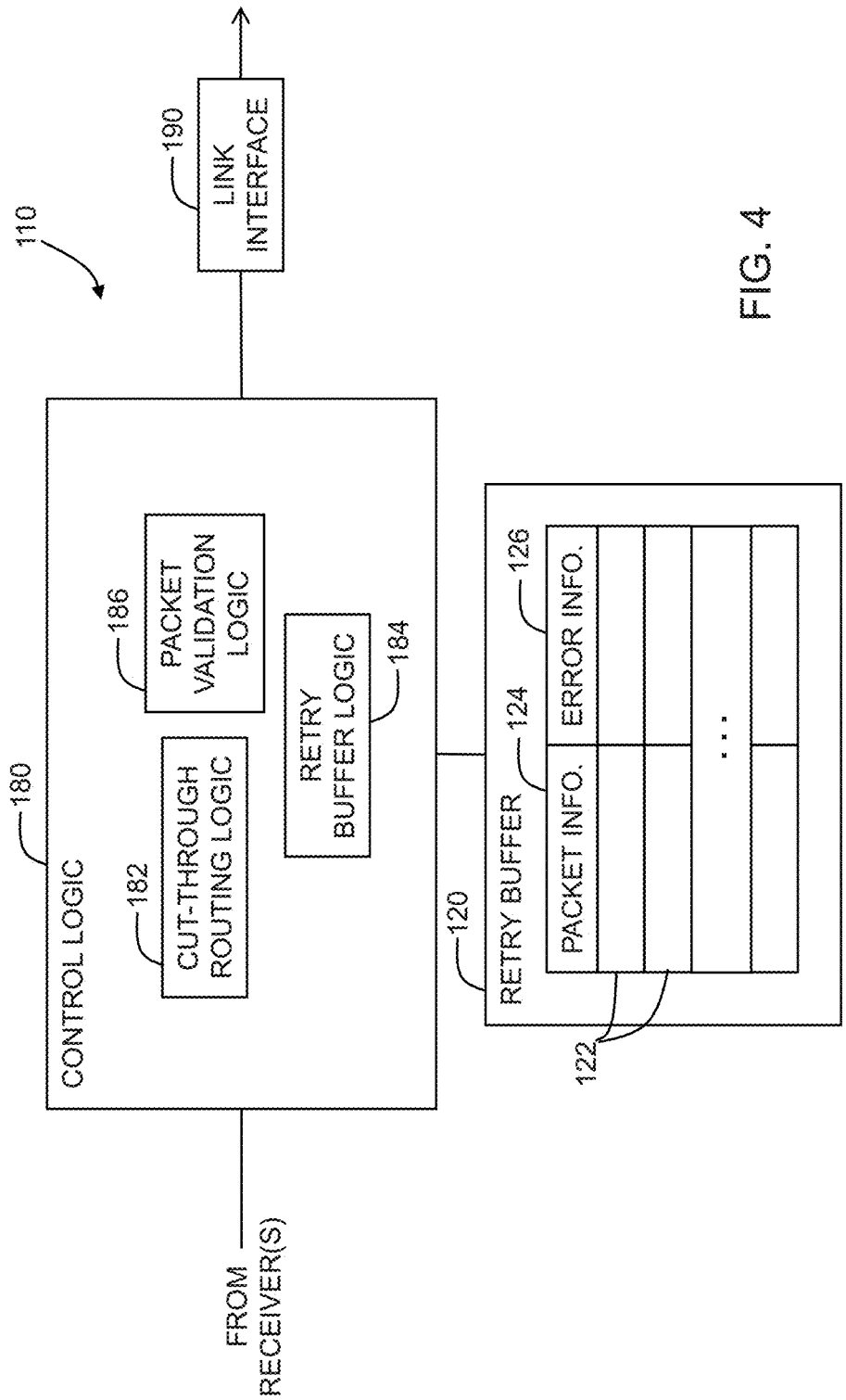
FIG. 4 shows an example of a transmitter in accordance with various examples.

FIG. 4 shows an example of an implementation of transmitter 110, although the implementation depicted in FIG. 4 also may apply to the other transmitters 154, 164, and 174. The transmitter 110 includes control logic 180 coupled to the retry buffer 120. The control logic 180 may be implemented as a programmable controller, programmable logic device, application specific integrated circuit (ASIC), etc. The control logic 180 may include cut-through routing logic 182, retry buffer logic 184, and packet validation logic 186. The cut-through routing logic 182 causes portions of packets received by the transmitter from upstream receivers to be forwarded on through link interface 190 to downstream receivers across a corresponding link before the entire packet is received and validated by the upstream receiver. The cut-through routing logic 182, retry buffer logic 184, and packet validation logic 186 are implemented as a hardware processor executing machine instructions or as other hardware.

The retry buffer logic 184 may add new entries 124 to the buffer as packets are transmitted by the transmitter 110. The retry buffer logic 184 may access the retry buffer 120 upon receipt of a retry request to determine if the packet requested to be resent is corrupt (as determined by error information 126). If the requested packet is not corrupt, the retry buffer 184 causes or otherwise permits the packet to be resent via link interface 190. Upon receipt of an ACK for a given packet from a downstream transmitter, the retry buffer 184 removes the corresponding packet from the retry buffer.

In implementations in which the transmitter itself validates a packet, the packet validation logic 186 may validate a given packet to be, or being, transmitted by the transmitter 110. The packet validation logic 186 may check, for example, CRC bits included with the packet as explained above.

Figure 5:
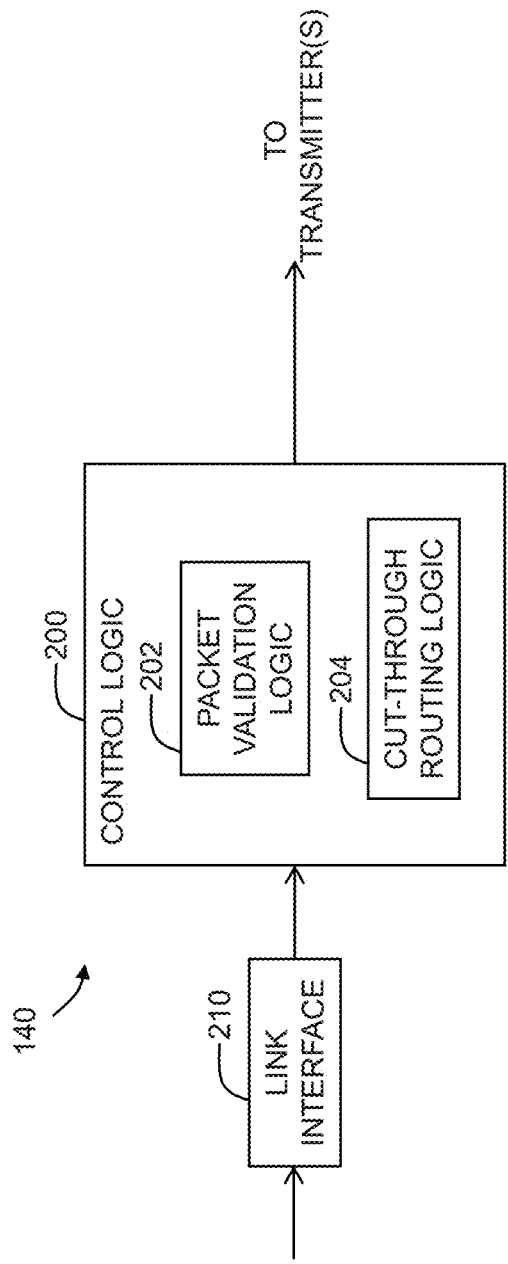
FIG. 5 shows an example of a receiver in accordance with various examples.

FIG. 5 shows an example of an implementation of a receiver 140, although the implementation may apply to other receivers as well (e.g., receivers 152, 162, 172). The illustrative receiver 140 may include control logic 200 coupled to a link interface 210. Packets are received by the control logic 200 over a link and through link interface 210. The control logic 200 may include packet validation logic 202 and cut-through routing logic 204 implemented as a hardware processor executing machine instructions or other hardware. As explained above, packet validation logic 202 may check, for example, CRC bits in each received packet. The cut-through routing logic 204 causes portions of packets received by the receiver's control logic 200 from upstream transmitters to be forwarded on to downstream transmitters in the same processing device before the entire packet is received and validated (e.g., by receiver 140).

Figure 6:
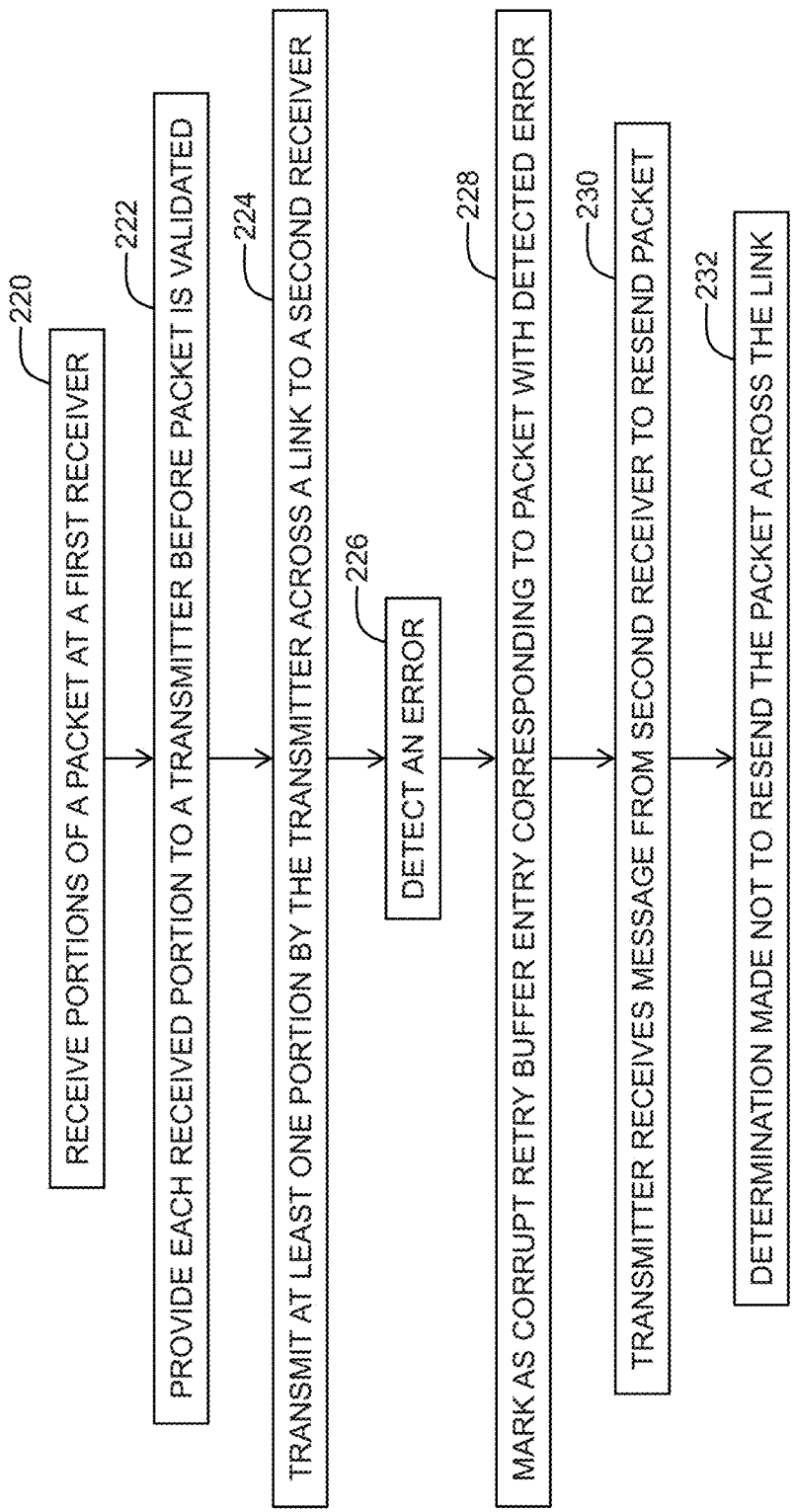
FIG. 6 shows a method in accordance with various examples.

FIGS. 6 and 7 provide examples of methods. The operations depicted in FIGS. 6 and 7 may be performed in the order shown, or in a different order. Further, the operations may be performed sequentially, or two or more of the depicted operations may be performed in parallel.

In FIG. 6, the method includes operation 220 in which portions of a packet are received by a first receiver. At 222, the method includes providing each received portion to a transmitter internal to the same processing device containing the first receiver before the packet is validated. At 224, the method further includes transmitting at least one received portion received by the transmitter across a link to a second receiver (i.e., a receiver external to the processing device containing the transmitter).

At 226, the method includes detecting an error in the packet. In one example, error detection may be based on CRC bits included in the packet. As a result of detecting an error, an entry corresponding to the packet having the error in a retry buffer of a transmitter is marked as corrupt (228). At 230, the method includes receiving a message at the transmitter from the second (external) receiver to resend the packet across the link. The packet to be resent, however, has been determined to have an error. Thus, at 232, a determination is made (e.g., by the transmitter) not to resend the packet across the link.

The method of FIG. 7 includes the same operations 220-224 which are not repeated here. At 240, the method of FIG. 7 includes the first receiver (i.e., the receiver that received the packet at 220), detecting an error in the packet. The detection of the error, however, may have occurred after at least one portion of the packet has already been transmitted by the transmitter across the second link (224). At 242, the first receiver responds to the detection of the error by informing the transmitter of the error. The transmitter then marks the packet as corrupt in its retry buffer (244). At 246, the transmitter may receive a message initiated by a second receiver (downstream from the transmitter) to resend the packet. The transmitter examines its retry buffer for the packet targeted by the retry message. If the packet has not been marked as corrupt in the retry buffer (250), the transmitter resends the packet at 252; otherwise, if the packet has been marked as corrupt, the transmitter makes a determination not to resend the packet.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processing device, comprising:
   an internal upstream receiver internal to the processing device to receive packets from an upstream link and to validate the received packets;
   an internal downstream transmitter downstream to the internal upstream receiver to receive packets from the internal upstream receiver and to forward those packets across a downstream link to an external receiver external to the processing device; and
   a retry buffer accessible to the internal downstream transmitter, wherein a respective entry in the retry buffer comprises a packet-information field and an error-information field;
   wherein the internal downstream transmitter is to receive a portion of a packet from the internal upstream receiver and to begin transmitting the portion across the downstream link to the external receiver before the entire overall packet, of which the portion is a part, is received and validated by the internal upstream receiver that is upstream to the internal downstream transmitter;
   wherein the internal downstream transmitter is to set at least one bit in the error-information field of an entry corresponding to the overall packet in the retry buffer in response to receiving an error message from the internal upstream receiver, and not resend the overall packet across the downstream link even if a message is received from the external receiver to resend the overall packet;
   wherein the internal upstream receiver is to receive the overall packet across an upstream link from an external transmitter external to the processing device and to forward the portion of the overall packet to the internal downstream transmitter before the internal upstream receiver validates the entire overall packet; and wherein, after forwarding the portion to the internal downstream transmitter, the internal upstream receiver is to detect an error in the overall packet and to inform the internal downstream transmitter of the error for the internal downstream transmitter to thereby determine the overall packet to have the error.

2. The processing device of claim 1, wherein the downstream transmitter is to respond to receipt of the request for a retry of a packet that has an error by transmitting a message to the external receiver to drop the packet and cease requesting a retry.

3. The processing device of claim 1, wherein the upstream receiver detects the error based on error-detection information included in the overall packet.

4. A processing device, comprising:

a downstream transmitter;

an upstream receiver that is upstream to the downstream transmitter, wherein the upstream receiver is to receive packets over an upstream link, to validate each received packet, and to perform cut-through routing to the downstream transmitter in which portions of a packet are to be forwarded from the upstream receiver to the downstream transmitter before the entire packet is validated by the upstream receiver; and a retry buffer to include a plurality of entries, each entry to include a packet-information field and an error-information field indicating whether the packet corresponding to the packet information has experienced an error;

wherein the downstream transmitter also is to perform cut-through routing in which a portion of a packet received by the downstream transmitter from the upstream receiver is to be transmitted by the downstream transmitter across a downstream link to a downstream receiver before the packet is validated by the upstream receiver;

wherein the upstream receiver detects whether a given packet has an error and sends an error message to the downstream transmitter after the downstream transmitter has already transmitted at least one portion of the given packet across the downstream link to the downstream receiver;

wherein the downstream transmitter is to set at least one bit in the error-information field of an entry corresponding to the given packet in the retry buffer in response to receiving from the upstream receiver the error message; and wherein the downstream transmitter is to implement link level retry in which the downstream transmitter is to retry a packet in the retry buffer across the downstream link to the downstream receiver upon request for a retry received over the downstream link if the at least one bit in the error-information field corresponding to the packet is not set in the retry buffer, but not to retry the packet if the at least one bit in the error-information field corresponding to the packet is set to indicate an error.

5. The processing device of claim 4, wherein the downstream transmitter is to respond to receipt of the request for a retry of a packet that has an error by transmitting a message to the downstream receiver to drop the packet and cease requesting a retry.

6. The processing device of claim 4, wherein the upstream receiver detects whether a given packet has an error based on error-detection information included in the given packet.

7. A method, comprising:

receiving portions of a packet at an upstream receiver;

providing a received portion to a downstream transmitter that is downstream to the upstream receiver before the packet is validated;

transmitting, by the downstream transmitter, the received portion across a downstream link to a downstream receiver;

adding an entry corresponding to the packet in a retry buffer, wherein the entry comprises a packet-information field and an error-information field;

detecting, by the upstream receiver, an error in the packet;

sending an error message from the upstream receiver to the downstream transmitter;

in response to receiving the error message from the upstream receiver, setting, by the downstream transmitter, at least one bit in the error-information field of the entry corresponding to the packet in the retry buffer;

receiving a message at the downstream transmitter from the downstream receiver to resend the packet across the downstream link; and not resending the packet by the downstream transmitter across the downstream link.

8. The method of claim 7 wherein not resending the packet comprises examining the retry buffer to determine if the requested packet is corrupt.

9. The method of claim 7, further comprising transmitting a message to the downstream receiver to drop the packet and cease requesting a retry.

10. The method of claim 7, wherein detecting, by the upstream receiver, the error in the packet comprises analyzing error-detection information included in the packet.

* * * * *